US010171561B2

(12) United States Patent
Chang et al.

(10) Patent No.: US 10,171,561 B2
(45) Date of Patent: *Jan. 1, 2019

(54) CONSTRUCT DATA MANAGEMENT BETWEEN LOOSELY COUPLED RACKS

(71) Applicant: International Business Machines Corporation, Armonk, NY (US)

(72) Inventors: John Yow-Chun Chang, Austin, TX (US); Ching-Yun Chao, Austin, TX (US); Patrick L. Davis, Pflugerville, TX (US); Rohan Gandhi, Cedar Park, TX (US); Yuhsuke Kaneyasu, Tokyo (JP); Lewis Lo, Toronto (CA); Ki H. Park, Cary, NC (US); Ankit Patel, Austin, TX (US); Kin Ueng, Austin, TX (US); Iqbal M. Umair, Mississauga (CA); Leonardo A. Uzcategui, Westminster, CO (US); Barbara J. Vander Weele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 517 days.

This patent is subject to a terminal disclaimer.

(21) Appl. No.: 14/937,081

(22) Filed: Nov. 10, 2015

(65) Prior Publication Data

US 2017/0134302 A1    May 11, 2017

(51) Int. Cl.
*H04L 29/08* (2006.01)
*H04L 29/06* (2006.01)
(Continued)

(52) U.S. Cl.
CPC .............. *H04L 67/10* (2013.01); *G06F 9/00* (2013.01); *H04L 9/3263* (2013.01); *H04L 63/0823* (2013.01)

(58) Field of Classification Search
CPC ....... H04L 47/70; H04L 67/10; H04L 9/3263; H04L 63/0823
(Continued)

(56) References Cited

U.S. PATENT DOCUMENTS 8,385,202 B2   2/2013   Kuik et al.
8,924,723 B2   12/2014  Chang et al.
(Continued)

OTHER PUBLICATIONS

Mell, et al., "The NIST Definition of Cloud Computing", Recommendations of the National Institute of Standards and Technology. Special Publication 800-145, Sep. 2011. 7 pages.

*Primary Examiner* — James E Springer
(74) *Attorney, Agent, or Firm* — Stosch Sabo

(57) ABSTRACT

A construct having a plurality of distributed resources can include a portion of a second rack having a plurality of computing devices controlled by a second management node. The second management node can determine it contains insufficient construct data such as user data, group data, resource data, or authorization policy data to execute an operation associated with the construct. The second management node can synchronize at least a portion of construct data with a first management node. The first management node can be associated with the construct and a mutual trust relationship can exist between the first management node and the second management node. The first management node and the second management node can comprise autonomous management nodes capable of functioning independent of the network.

18 Claims, 6 Drawing Sheets

(51) Int. Cl.
  *H04L 9/32*       (2006.01)
  *G06F 9/00*       (2006.01)

(58) Field of Classification Search
  USPC .......................................................... 709/226
  See application file for complete search history.

(56) References Cited

U.S. PATENT DOCUMENTS

| | | | |
|---|---|---|---|
| 8,943,319 B2 | 1/2015 | Chang et al. | |
| 9,148,285 B2 | 9/2015 | Chang et al. | |
| 9,906,370 B2* | 2/2018 | Apte | H04L 9/3263 |
| 9,985,954 B2* | 5/2018 | Chang | H04L 63/0807 |
| 2006/0136713 A1* | 6/2006 | Zimmer | H04L 63/0428 |
| | | | 713/150 |
| 2013/0133045 A1* | 5/2013 | Hayes | H04L 63/08 |
| | | | 726/5 |
| 2014/0068705 A1 | 3/2014 | Chambers et al. | |
| 2014/0075179 A1* | 3/2014 | Krishnapura | G06F 9/448 |
| | | | 713/100 |
| 2014/0317716 A1 | 10/2014 | Chao et al. | |
| 2015/0081878 A1* | 3/2015 | Pabba | H04L 41/0806 |
| | | | 709/224 |
| 2015/0248487 A1* | 9/2015 | Baranowski | G06F 17/30958 |
| | | | 707/609 |
| 2015/0319171 A1* | 11/2015 | Robison | H04L 63/08 |
| | | | 713/171 |
| 2016/0011894 A1* | 1/2016 | Reddy | H04L 67/38 |
| | | | 718/1 |
| 2016/0013992 A1* | 1/2016 | Reddy | H04L 67/38 |
| | | | 709/224 |
| 2016/0014039 A1* | 1/2016 | Reddy | H04L 67/38 |
| | | | 709/224 |
| 2017/0003951 A1* | 1/2017 | Newell | G06F 8/65 |
| 2017/0054603 A1* | 2/2017 | Kulkarni | H04L 41/0893 |

* cited by examiner

CONSTRUCT DATA MANAGEMENT BETWEEN LOOSELY COUPLED RACKS

BACKGROUND

The present disclosure relates to constructs, and more specifically, to managing construct data amongst a network of loosely coupled racks.

SUMMARY

Aspects of the present disclosure relate to a computer program product, a system, and a computer-implemented method for managing construct data between a network of loosely coupled racks. The method can comprise associating at least a portion of a second rack to a construct in response to an input received from a first management node of a first rack associated with the construct. The construct can include a set of distributed resources connected via a network and comprising at least a respective portion of a plurality of respective racks. The construct can further include a set of construct data comprising user data, group data, resource data, and authorization policy data. Each respective rack can be independently controlled by a respective management node of a plurality of autonomous management nodes including at least the first management node and a second management node associated with the second rack. A respective mutual trust relationship can exist between each respective pair of autonomous management nodes of the plurality of autonomous management nodes. The method can further comprise determining, by the second management node, that the second management node contains insufficient construct data to execute an operation associated with the construct. The method can further comprise synchronizing, in response to a request from the second management node to the first management node, at least a portion of the construct data between the first management node and the second management node.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
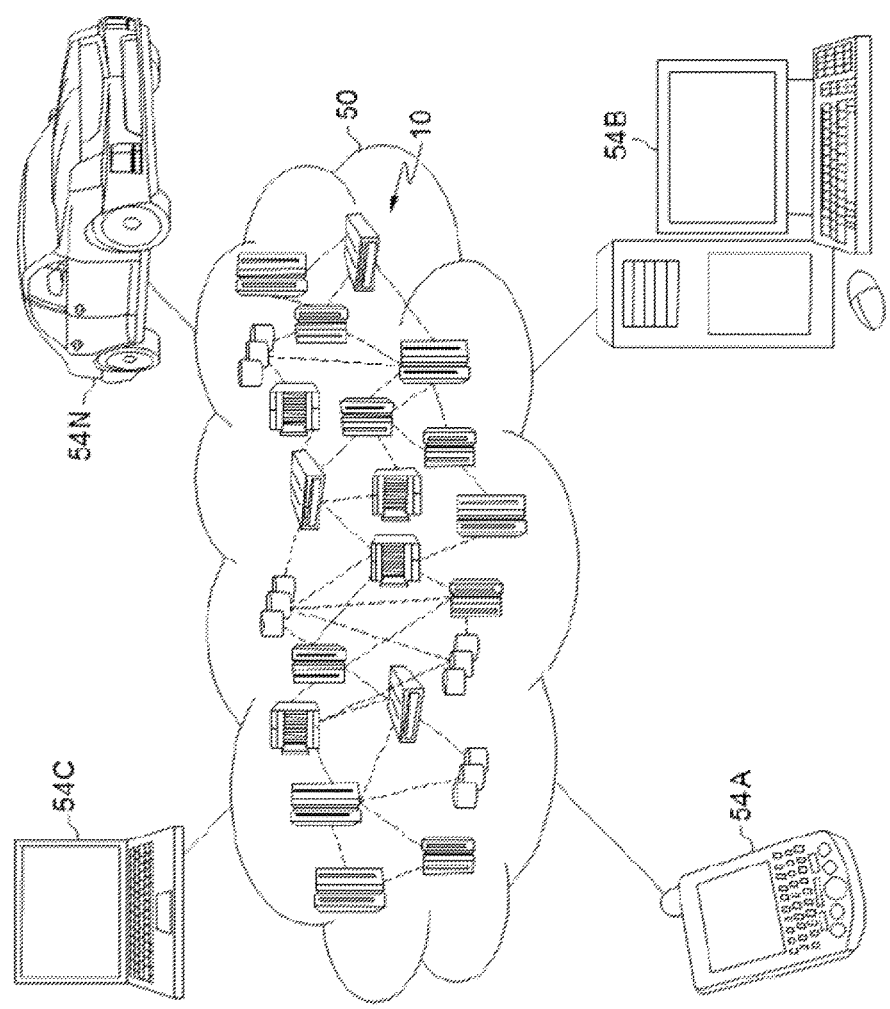
FIG. 1 depicts a cloud computing environment according to an embodiment of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The present disclosure relates to constructs, and more specifically, to managing construct data amongst a network of loosely coupled racks. According to the present disclosure, the term "rack" should be construed to mean a set of nodes. The nodes can comprise network components, networking devices, storage devices, servers, blades, or other components according to various embodiments of the present disclosure. Each rack can include a management node. The management node can manage the operations of the various components comprising the rack. The management node can further communicate and interact with other management nodes of other racks. Thus, a plurality of management nodes overseeing a plurality of respective racks can be communicatively coupled together to form, for example, a data center capable of improved storage, processing or other computational operations.

For the purposes of the present disclosure, a set of loosely coupled racks refers to a plurality of racks being connected via a network and capable of sharing resources and interacting with one another while remaining functionally independent of the network. In some cases, a loosely coupled network can have no portion of the network dedicated to management of the network as a whole. Thus, one failed node of the network may not cause failure of other nodes. Furthermore, in some cases, a loosely coupled network has no portion of the network dedicated to data storage of the information used by the network as a whole.

For the purposes of the present disclosure, the term "construct" should be construed to mean a set of distributed computing resources connected via a network. The computing resources can comprise processing, storage, networking, or other resources beneficial to computing operations. The set of distributed computing resources can comprise resources associated with a plurality of loosely coupled racks. In some embodiments, a resource can comprise a portion of a computing device associated with a respective rack.

Each management node of a set of loosely coupled racks can store an individual set of construct data which can be accessed by the management node to execute operations associated with the construct. Construct data can moderate resource sharing amongst, and interaction by users with, the construct. The construct data may or may not be synchronized between any pair of racks within a loosely coupled network (e.g., a user profile A can be stored in management node 1 but not in management node 2). Construct data can include, but is not limited to, user data, group data, resource data, and authorization policy data.

Numerous advantages can be realized according to various embodiments of the present disclosure. Firstly, respective management nodes associated with a construct can update construct data on an as-needed basis. This can increase efficiency due to decreased computational power consumption, bandwidth usage, and message queries. Secondly, the plurality of distributed management nodes can each contain an independent set of construct data. This can improve redundancy by the de-centralized distribution of the construct data. Thirdly, the combination of the first and second advantages can enable a network of loosely coupled racks to efficiently adapt to numerous changes in resources, users, and policies.

It is to be understood that the aforementioned list of advantages provides example advantages and not every advantage is listed. Furthermore, embodiments of the present disclosure may display all, some, or none of the aforementioned advantages while remaining within the spirit and scope of the present disclosure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as-needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
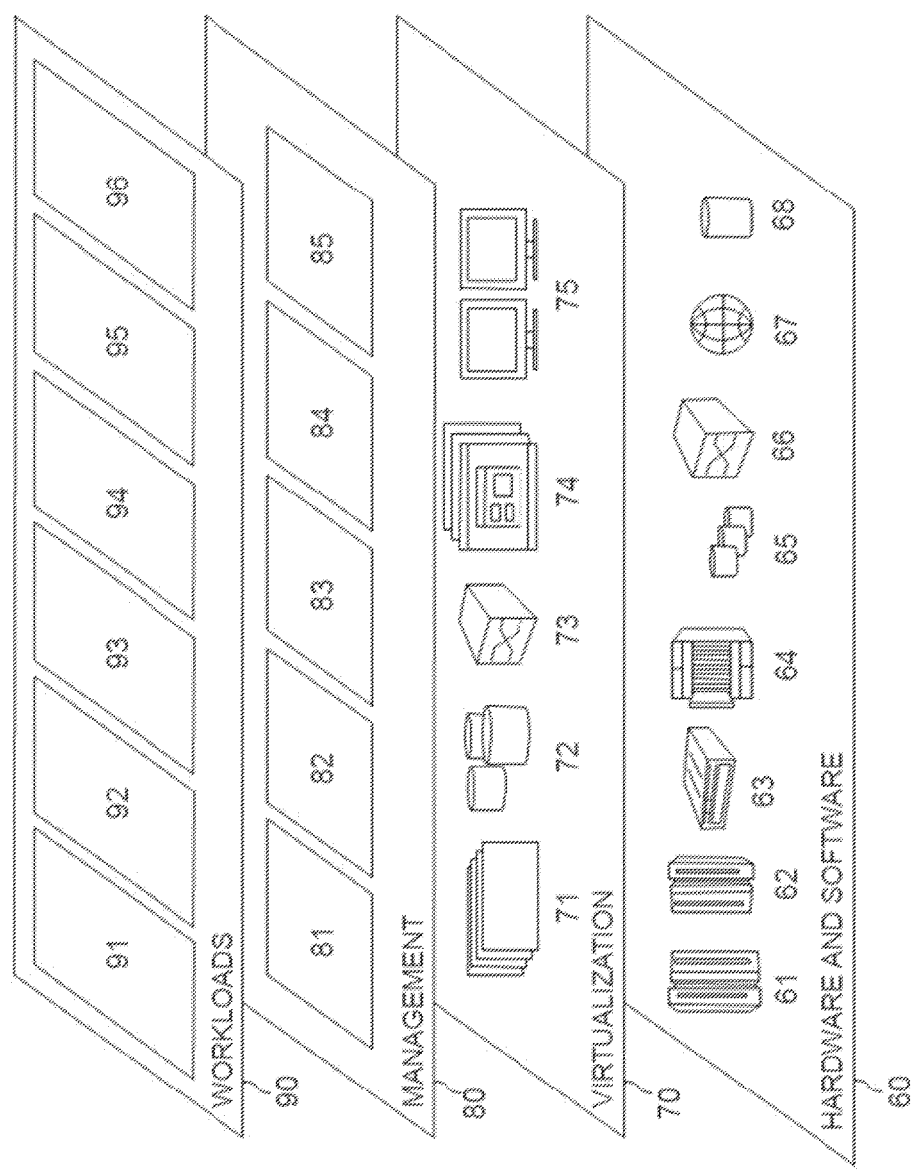
FIG. 2 depicts abstraction model layers according to an embodiment of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96. According to various embodiments of the present disclosure, the methods described hereinafter with respect to FIG. 4-6 can be implemented by one or more components appearing in hardware and software layer 60 of FIG. 2.

Figure 3:
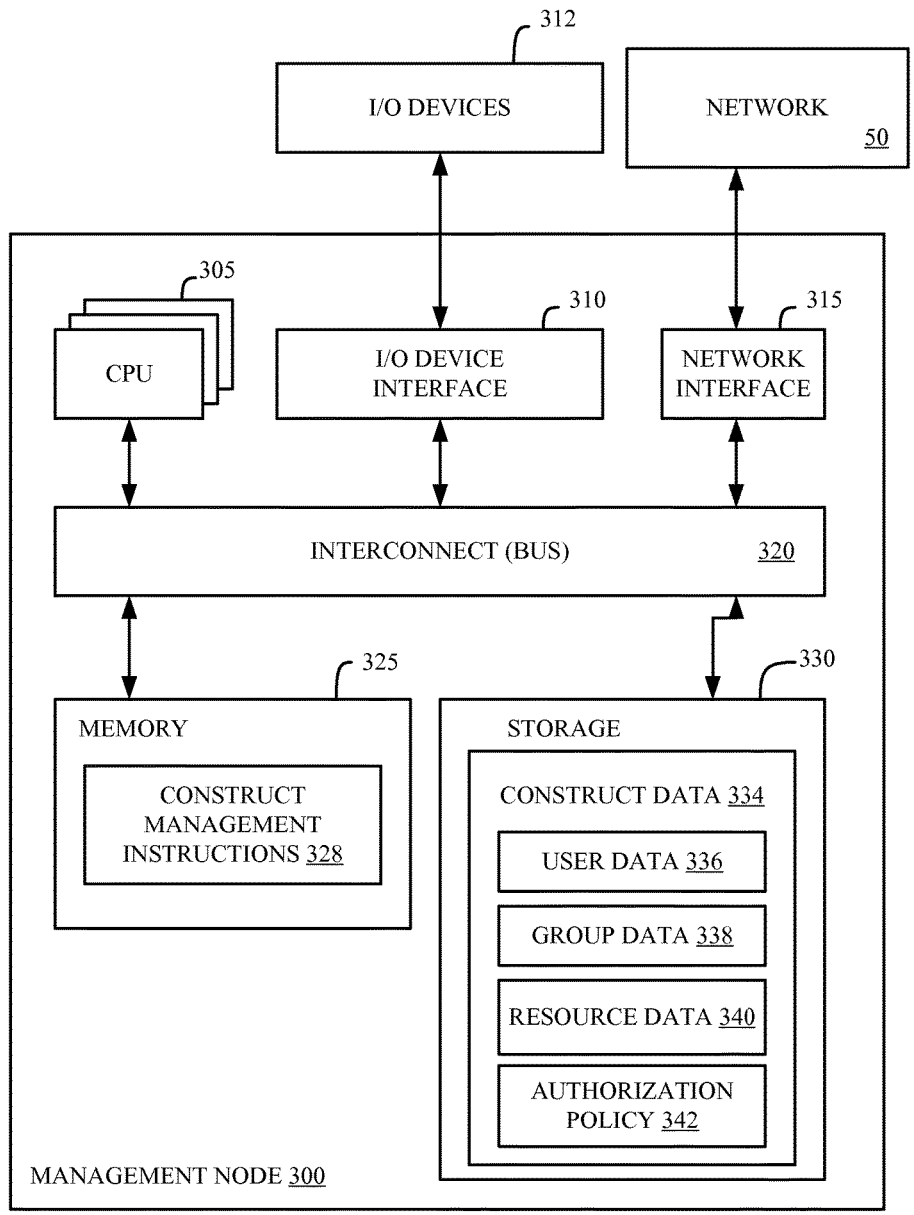
FIG. 3 illustrates a block diagram of a management node according to some embodiments of the present disclosure.

Referring now to FIG. 3, shown is a block diagram of a management node according to some embodiments of the present disclosure. In some embodiments, the management node is the same or substantially the same as an illustrative component appearing in hardware and software layer 60 of FIG. 2 and/or the cloud computing nodes 10 of FIG. 1. It should be understood that management node 300 is not limited exclusively to the aforementioned examples. Rather, the management node 300 can, in some embodiments, comprise components appearing in other aspects of FIG. 1 and FIG. 2 where the alternative component can benefit from establishing, transferring, and/or receiving construct data associated with a construct. The management node 300 can be associated with one or more computing devices. The computing devices can comprise one or more of the illustrative components appearing in hardware and software layer 60 of FIG. 2 and/or the cloud computing nodes 10 of FIG. 1. In some embodiments, the management node controls at least a portion of one or more computing devices that are associated with a construct.

In various embodiments, the management node 300 includes a memory 325, storage 330, interconnect (e.g., BUS) 320, one or more processors (e.g., CPUs) 305, an I/O device interface 310, I/O devices 312, and a network interface 315.

Each CPU 305 retrieves and executes programming instructions stored in the memory 325 or storage 330. The interconnect 320 is used to move data, such as programming instructions, between the CPU 305, I/O device interface 310, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., SRAM, DRAM, or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the node 300 via the I/O devices 312 or a communication network via the network interface 315.

In some embodiments, the memory 325 stores construct management instructions 328 and the storage 330 stores construct data 334. However, in various embodiments, the construct management instructions 328 and the construct data 334 are stored partially in memory 325 and partially in storage 330, or they are stored entirely in memory 325 or entirely in storage 330, or they are accessed over a network via the network interface 315.

Figure 4:
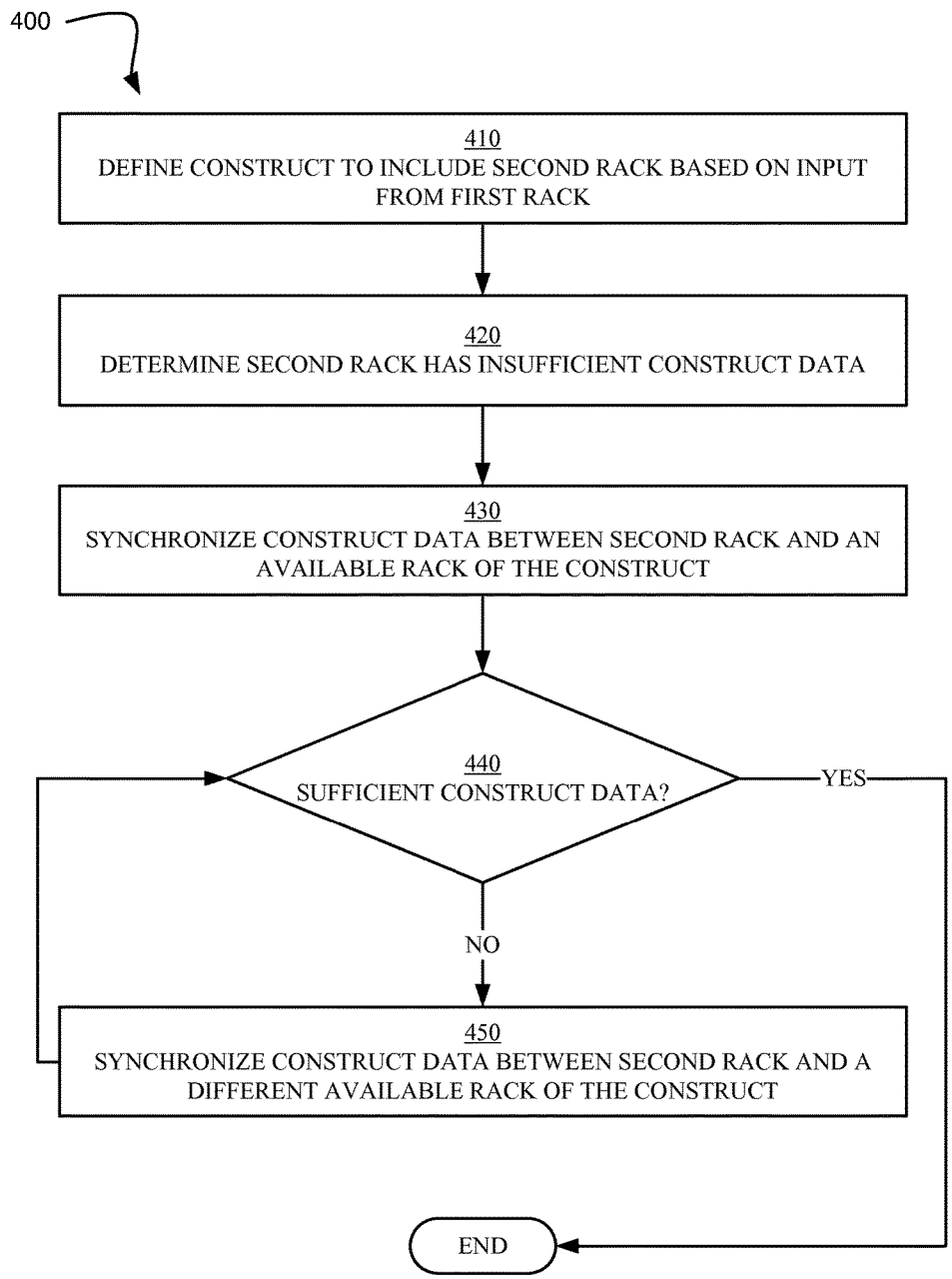
FIG. 4 illustrates a flowchart of a method for retrieving construct data in accordance with some embodiments of the present disclosure.
Figure 5:
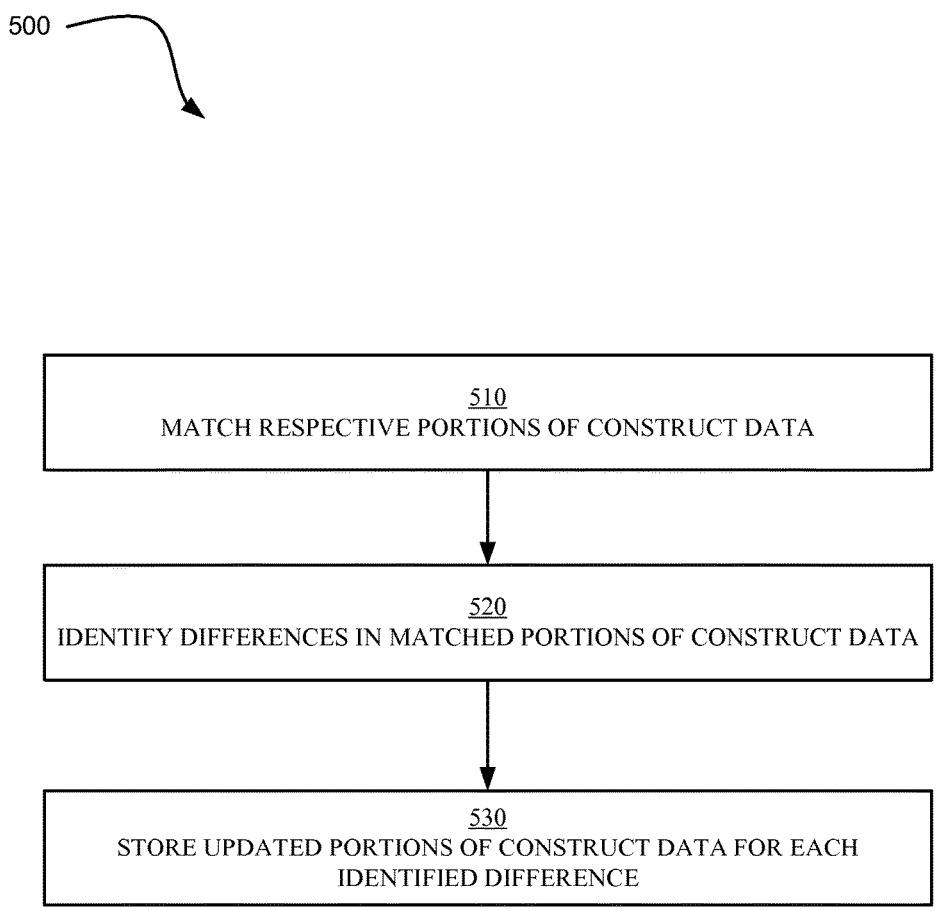
FIG. 5 illustrates a flowchart of a method for synchronizing construct data in accordance with some embodiments of the present disclosure.
Figure 6:
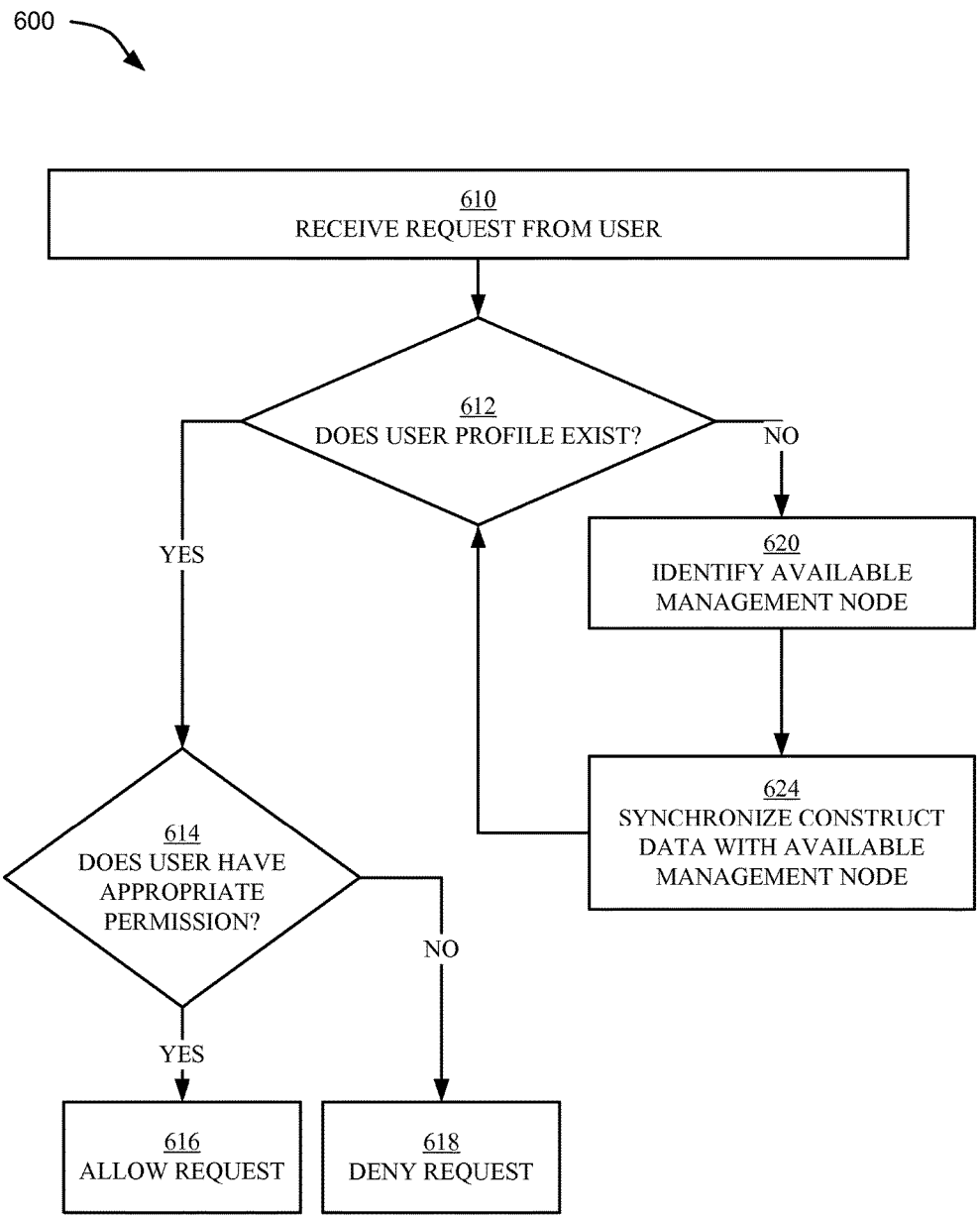
FIG. 6 illustrates a flowchart of a method for executing an example construct operation in accordance with some embodiments of the present disclosure.

The construct management instructions 328 (also referred to herein as instructions 328) can store processor executable instructions for various methods such as the methods shown and described with respect to FIG. 4-6. In some embodiments, the construct data 334 can contain user data 336, group data 338, resource data 340, and/or authorization policy data 342.

The user data 336 can include, but is not limited to, user profiles. User profiles can be based on, among other things, unique login profiles, generic login profiles, profiles associated with a physical workstation, or a combination of these and other factors.

The group data 338 can comprise sets of users where the sets of users share similar properties such as, but not limited to, location, work group, security group, and so on. Users and groups can be catalogued using, for example, the lightweight directory access protocol (LDAP) according to some embodiments of the present disclosure.

The resource data 340 can comprise names, locations, and properties (e.g., CPU, memory, and/or storage information) associated with the various resources in the construct.

The authorization policy 342 can contain information regarding the respective rights, accesses, and/or permissions moderating interaction between users 336 or groups 338 and the construct resources. In various embodiments, the authorization policy 342 refers to read permissions, write permissions, administrative permissions, and other permissions associated with user interaction with an environment profile. Read permissions can allow a user or group to view a set of stored data. Write permissions can allow a user or group to modify a set of stored data. Administrative permissions can allow a user or group various authorities associated with adding or removing user access rights, group access rights, user profiles, and group profiles. The aforementioned permissions can be compiled in, for example, access control lists (ACLs). The authorization policy 342 can also be referred to as an access policy or a set of access control data in various embodiments of the present disclosure.

Referring now to FIG. 4, shown is a flowchart illustrating a method of synchronizing construct data between management nodes in accordance with some embodiments of the present disclosure. The method 400 can, in some embodiments, be performed by a processor (e.g., processor 305 of FIG. 3) executing a set of instructions (e.g., instructions 328 of FIG. 3) in accordance with the method 400.

The method 400 can begin with operation 410. Operation 410 can define a construct to include a second rack based on an input received from a first rack associated with the construct. Defining the construct can comprise creating the construct or modifying the construct. The input received by the first rack to include at least a portion of the second rack can be received by, for example, a user interface (e.g., I/O devices 312 of FIG. 3). In some embodiments, the second rack must be connected to the first rack at the time the construct is defined to include at least a portion of the second rack.

The construct can comprise a set of distributed computing resources, or portions thereof. Each respective computing resource, or portion thereof, can be associated with a respective rack. Each respective rack can be associated with a respective management node.

The plurality of racks can comprise loosely coupled racks. Thus, each respective management node can comprise an autonomous management node capable of functioning independently of the other management nodes. Each respective management node can contain a respective set of construct data beneficial to successfully executing operations associated with the construct. The construct data can include, but is not limited to, user data, group data, resource data, and/or authorization policy data.

Each respective management node associated with the construct (via the respective computing resources, or portions thereof, associated with the construct) can have a mutual trust relationship with each other respective management node associated with the construct. Mutual trust relationships can expedite and protect interactions between respective management nodes. Protocols for establishing trust relationships are known to one of skill in the art. For example, illustrative trust establishment protocols which can be used with the techniques discussed herein are described in more detail in U.S. patent application Ser. No. 13/865,692, U.S. patent application Ser. No. 13/745,942, and U.S. patent application Ser. No. 14/019,836. Thus, trust relationships, including the use of PKI technology, public and private keys, certificates of authority, and security tokens will not be described in further detail herein. It should be understood that advancements in trust relationships which simplify, expedite, or otherwise improve upon known methods, mechanisms, and/or protocols fall within the spirit and scope of the present disclosure.

In operation 420, the second management node associated with the second rack can determine that the second management node contains insufficient construct data. The second management node can determine it has insufficient construct data based on, for example, a failed operation associated with the construct. Examples of insufficient construct data can include, but are not limited to, user data, group data, resource data, or authorization policy data.

In operation 430, the second management node can synchronize at least a portion of the construct data contained on the second management node with at least a portion of construct data contained in an available management node associated with the construct. The available management node can be the first management node or a different management node associated with the construct according to various embodiments. Operation 430 can further comprise identifying an available management node associated with the construct. An available management node can comprise a management node connected to the network (i.e., an online management node). Operation 430 will be described in further detail hereinafter with respect to FIG. 5.

In operation 440, the second management node can determine if it contains sufficient construct data following the synchronization of operation 430. The determination can be based on, but not limited to, a successful or unsuccessful execution of an operation associated with the construct. An example of operation 440 will be described hereinafter with respect to FIG. 6.

In cases where the second management node determines that it does contain sufficient construct data, the method 400 can end by executing the operation associated with the construct. In cases where the second management node determines it does not contain sufficient construct data, the method 400 can proceed to operation 450.

In operation 450, the second management node can synchronize at least a portion of the construct data with a different management node associated with the construct. Thus, operation 450 can further comprise identifying an available management node associated with the construct that is different from the management node identified in operation 430.

Following operation 450, the method 400 returns to operation 440 to determine if the second management node contains sufficient construct data. Thus, the method 400 can loop between operations 440 and 450 until the second management node contains sufficient construct data.

As a specific example, consider a node A and a node B. Construct E is created to include at least a portion of node B based on an input received at node A (e.g., operation 410). The construct E comprises nodes A, B, and C, users 1 and 2, and group X. Node B receives a query from user 1. Node B, however, does not have data regarding user 1 (e.g., operation 420). Thus, node B synchronizes the construct data between node B and, for example, node A. Node B stores the updated, synchronized construct data in memory (e.g., operation 430). If the synchronized construct data includes user 1, then node B may have sufficient construct data to execute operations associated with construct E and user 1.

Alternatively, node B may nonetheless contain insufficient construct data regarding user 1 despite synchronizing construct data with node A. In this example, node B can then identify and synchronize construct data with a different node associated with the construct E, such as, for example, node C (e.g., operation 450).

Advantageously, as shown and described with respect to FIG. 4, the construct data associated with the construct can be distributed on an as-needed basis between relevant management nodes. Thus, there is no centralized locus of the data associated with the various constructs, and, as a result, the network has an increased redundancy. In addition, the method shown and described with respect to FIG. 4 can exhibit a higher efficiency due to the storing of information and exchanging of messages occurring on an as-needed basis. Thus, in some embodiments, various management nodes are not required to store construct data updates which are not relevant to construct operations conducted by said management nodes.

Referring now to FIG. 5, shown is a method for synchronizing construct data in accordance with some embodiments of the present disclosure. The method 500 illustrated in FIG. 5 can be performed by one or more processors (e.g., processor 305 of FIG. 3) according to a set of instructions (e.g., instructions 328 of FIG. 3).

The method 500 can begin with operation 510. Operation 510 can match respective sets of construct data, or portions thereof. For example, in some embodiments, user data can be synchronized while in alternative embodiments all construct data can be synchronized. The matching can occur between the respective portions of construct data contained in two management nodes associated with the respective construct.

In operation 520, zero or more differences in the matched portions of the construct data can be identified. The zero or more differences can comprise differences in user data, group data, resource data, or authorization policy data. The differences can comprise modifications, additions, or deletions between respective sets of construct data.

In operation 530, the management nodes can store an updated portion of construct data for each respective difference found in the matched portions of construct data. In some embodiments, operation 530 can further include deleting outdated portions of construct data.

Thus, the method 500 details the synchronizing of construct data between two management nodes associated with a construct. In various embodiments, all construct data is synchronized between the respective management nodes while in alternative embodiments, a portion of the construct data is synchronized between management nodes. In either case, the synchronization can result in an updated version of at least a portion of the construct data.

Referring now to FIG. 6, shown is a flowchart illustrating an example method for executing a construct operation in accordance with some embodiments of the present disclosure. The method 600 can be executed by one or more processors (e.g., processors 305 of FIG. 3) executing a set of instructions (e.g., instructions 328 of FIG. 3).

The method 600 can begin with operation 610 in which a management node associated with the construct receives a request associated with the construct from a user. For example, the request can be, but is not limited to, a request for access to stored data, a request for permission to modify stored data, or a request for permission to modify some aspect of the construct data.

In operation 612, the management node can search for a user profile and/or an authorization policy which are associated with the user. The management node can search for the user profile and/or the authorization policy within the construct data stored on the management node. Should the user profile and/or authorization policy associated with the user be stored or located at the management node, the method 600 can proceed to operation 614. In operation 614, the user profile and/or the authorization policy associated with the user can be read. Should the user have appropriate permissions, the management node can allow the request in operation 616. Should the user not have appropriate permissions, the management node can deny the request in operation 618.

Referring again to operation 612, should the management node be unable to locate, on the management node, a user profile and/or authorization policy which are associated with the user, the method 600 can proceed to operation 620. In operation 620, the management node can identify an available management node which is associated with the construct. In various embodiments, an available management node can comprise a node communicatively coupled to the network and, therefore, able to interact with other management nodes of the construct. Thus, an unavailable management node can comprise a management node which is offline and unable to communicate via the network with the other management nodes associated with the construct.

In operation 624, the management node can synchronize construct data with the available management node. In some cases, the management node synchronizes a portion of the construct data, such as user data, with the available management node. In various embodiments, operation 624 utilizes the mutual trust relationship existing between the respective management nodes. For example, operation 624 can comprise initiating the synchronization by sending and receiving respective security tokens between the respective management nodes. The management nodes can authenticate the received security tokens using a public key of the sending management node. The authenticated security tokens can results in the initiation of the synchronization process between the respective management nodes.

Following operation 624, the method 600 can return to operation 612 to determine if the user profile exists. If the user profile does not exist, the method 600 can repeatedly loop through operations 620, 624, and 612 until the management node synchronizes data with an available management node containing sufficient data regarding the user. If, in operation 612, it is determined that the user profile does exist, the method 600 can proceed to operation 614. If the user has appropriate permissions then the user request can be allowed in operation 616. If the use does not have appropriate permissions, then the user request can be denied in operation 618.

Thus, the method 600 demonstrates that some embodiments of the present disclosure enable a management node to communicate with other management nodes associated with the same construct to synchronize sets of construct data on an as-needed basis. As a result, a network of loosely coupled racks can update relevant aspects of construct data on an as-needed basis during operations involving the construct.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    associating at least a portion of a second rack to a construct;
        wherein the associating occurs in response to input received by a first management node of a first rack associated with the construct;
        wherein the construct includes a set of distributed resources connected via a network and comprising at least a respective portion of a plurality of respective racks and a set of construct data comprising user data, group data, resource data, and authorization policy data;
        wherein each respective rack is independently controlled by a respective management node of a plurality of autonomous management nodes including at least the first management node associated with the first rack and a second management node associated with the second rack;

wherein a respective mutual trust relationship exists between each respective pair of autonomous management nodes of the plurality of autonomous management nodes;

determining, by the second management node, that the second management node contains insufficient construct data to execute an operation associated with the construct; and synchronizing, in response to the first management node receiving a request from the second management node comprising an authenticated first security token based on a public key of the second management node, at least a portion of the construct data between the first management node and the second management node.

2. The method of claim 1, wherein each respective rack, or portion thereof, defined in the construct is connected to the first management node via a network while defining the construct.

3. The method of claim 1 further comprising:
determining, by the second management node and in response to synchronizing at least a portion of the set of construct data, that the second management node contains insufficient construct data to execute the operation associated with the construct; and synchronizing, in response to determining that the second management node contains insufficient construct data, at least a portion of the set of construct data between the second management node and a third management node of the plurality of autonomous management nodes.

4. The method of claim 1, further comprising:
modifying the construct in response to input received by the second management node of the plurality of autonomous management nodes.

5. The method of claim 4, wherein the modifying comprises an addition of a portion of a third rack to the set of resources of the construct;
wherein the third rack is independently controlled by a third management node of the plurality of autonomous management nodes; and
synchronizing, in response to modifying the construct and receiving a request from the third management node to an available management node of the plurality of autonomous management nodes, at least a portion of the construct data between the third management node and the available management node.

6. The method of claim 1, wherein synchronizing at least a portion of the set of construct data further comprises:
matching at least a portion of the construct data of the first management node to at least a portion of the construct data of the second management node;
determining, based on the matching, zero or more differences between matched portions of construct data; and
storing, for each respective difference, an updated version of the respective portion of the construct data associated with the respective difference.

7. The method of claim 1, further comprising:
determining, by the second management node, that one or more management nodes of the plurality of autonomous management nodes is offline;
identifying, in response to determining that one or more management nodes are offline, an online management node of the plurality of autonomous management nodes; and synchronizing, in response to identifying the online management node, at least a portion of the set of construct data between the second management node and the online management node.

8. A system comprising:
a plurality of racks, wherein each respective rack comprises a respective set of computing devices, wherein each respective rack is controlled by a respective management node of a plurality of autonomous management nodes; wherein a respective mutual trust relationship exists between each respective pair of management nodes of the plurality of autonomous management nodes;

a construct comprising a set of resources including at least a respective portion of each respective rack of the plurality of racks and a set of construct data comprising user data, group data, resource data, and authorization policy data;

a first management node of the plurality of autonomous management nodes comprising a memory storing construct data and a processor configured to modify the construct to include at least a portion of a second rack in response to an input received by an interface communicatively coupled to the first management node; and a second management node associated with the second rack and of the plurality of autonomous management nodes comprising a memory storing construct data and a processor configured to:

determine the second management node contains insufficient construct data to execute an operation associated with the construct; and synchronize, in response to a different management node of the plurality of autonomous management nodes associated with the construct receiving a sent request comprising an authenticated first security token based on a public key of the second management node, at least a portion of the set of construct data between the second management node and the different management node.

9. The system of claim 8 wherein the processor of the second management node is further configured to:
determine, in response to synchronizing at least a portion of the set of construct data, that the second management node contains insufficient construct data to execute the operation associated with the construct; and synchronize, in response to determining that the second management node contains insufficient construct data, at least a portion of the set of construct data between the second management node and a second different management node of the plurality of autonomous management nodes associated with the construct.

10. The system of claim 8, wherein the processor of the second management node is further configured to:
modify the construct in response to input received by an interface communicatively coupled to the second management node.

11. The system of claim 10, wherein the modification comprises an addition of a portion of a third rack to the set of resources of the construct;
wherein the third rack is independently controlled by a third management node of the plurality of autonomous management nodes;
wherein the third management node comprises a memory storing construct data and a processor configured to:
synchronize, in response to determining the third management node contains insufficient construct data to execute an operation associated with the construct, and further in response to identifying an available management node associated with the construct, at least a portion of the construct data between the third management node and the available management node.

12. The system of claim 8, wherein the processor of the second management node configured to synchronize at least a portion of the set of construct data is further configured to:
   match a respective portion of the construct data of the first management node to a respective portion of the construct data of the second management node;
   determine, based on matching respective portions of construct data, zero or more differences between each respective matched portion of construct data; and
   store, for each respective difference, an updated version of the respective portion of the construct data associated with the respective difference.

13. The system of claim 8, wherein the processor of the second management node is further configured to:
   determine that one or more management nodes of the plurality of autonomous management nodes is offline;
   identify, in response to determining that one or more management nodes are offline, an online management node of the plurality of autonomous management nodes; and
   synchronize, in response to identifying the online management node, and further in response to determining the second management node contains insufficient construct data to execute an operation associated with the construct, at least a portion of the construct data between the second management node and the online management node.

14. A computer program product comprising a computer readable storage medium having program instructions embodied therewith, the program instructions executable by at least one processor to cause the at least one processor to:
   modify a construct to include at least a portion of a second set of resources associated with a second management node based on an input received from a first management node;
      wherein the construct comprises a set of distributed resources connected via a network and comprising at least a portion of a plurality of respective racks, the construct further comprising a set of construct data including user data, group data, resource data, and authorization policy data;
      wherein each respective rack is independently controlled by a respective management node of a plurality of autonomous management nodes including at least the first management node and the second management node;
      wherein a respective mutual trust relationship exists between each respective pair of autonomous management nodes of the plurality of autonomous management nodes;
   determine the second management node contains insufficient construct data to execute an operation associated with the construct; and
   synchronize, in response to the first management node receiving a request from the second management node comprising an authenticated first security token based on a public key of the second management node, and further in response to determining the second management node contains insufficient construct data, at least a portion of the set of construct data between the first management node and the second management node.

15. The computer program product of claim 14 wherein the program instructions are further configured to further cause the at least one processor to:
   determine, in response to synchronizing at least a portion of the set of construct data, that the second management node contains insufficient construct data to execute the operation associated with the construct; and
   synchronize, in response to determining that the second management node contains insufficient construct data, at least a portion of the set of construct data between the second management node and a third management node of the plurality of autonomous management nodes.

16. The computer program product of claim 14, wherein the program instructions are further configured to further cause the at least one processor to:
   modify the construct in response to input received by an interface communicatively coupled to the second management node.

17. The computer program product of claim 16, wherein modifying the construct comprises an addition of a portion of a third rack to the set of resources of the construct;
   wherein the third rack is independently controlled by a third management node of the plurality of autonomous management nodes;
   wherein the program instructions are further configured to further cause the at least one processor to:
   synchronize, in response to modifying the construct and identifying an available management node associated with the construct, and further in response to determining that the third management node contains insufficient construct data to execute an operation associated with the construct, at least a portion of the construct data between the third management node and the available management node.

18. The computer program product of claim 14, wherein the program instructions configured to cause the at least one processor to synchronize at least a portion of the set of construct data are further configured to further cause the at least one processor to:
   match a respective portion of the construct data of the first management node to a respective portion of the construct data of the second management node;
   determine, based on the matching, zero or more differences between each respective matched portion of construct data; and
   store, for each respective difference, an updated version of the respective portion of the construct data associated with the respective difference.

* * * * *